May 26, 1942.  H. M. CROSBY  2,284,372
OSCILLATION GENERATOR
Filed Dec. 16, 1939  2 Sheets-Sheet 1

Inventor:
Howard M. Crosby,
by Harry E. Dunham
His Attorney.

May 26, 1942.   H. M. CROSBY   2,284,372
OSCILLATION GENERATOR
Filed Dec. 16, 1939   2 Sheets-Sheet 2

Inventor:
Howard M. Crosby,
by Harry E. Dunham
His Attorney.

Patented May 26, 1942

2,284,372

UNITED STATES PATENT OFFICE 2,284,372

OSCILLATION GENERATOR

Howard M. Crosby, Schenectady, N. Y., assignor to General Electric Company, a corporation of New York Application December 16, 1939, Serial No. 309,639

16 Claims. (Cl. 250—36)

This invention relates to oscillation generators and has for its particular object to provide an oscillation generator whose operating frequency may be adjusted through a relatively broad range and whose frequency is at the same time highly stable at any point in this range even during changes in operating potential. By the term operating potential it is intended to include potentials between any of the electrodes of an electronic oscillator, all such potentials being derived from the same ultimate source.

Figure 1:
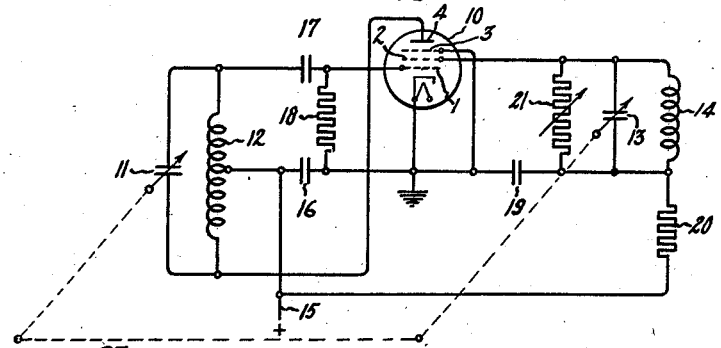
Figure 2:
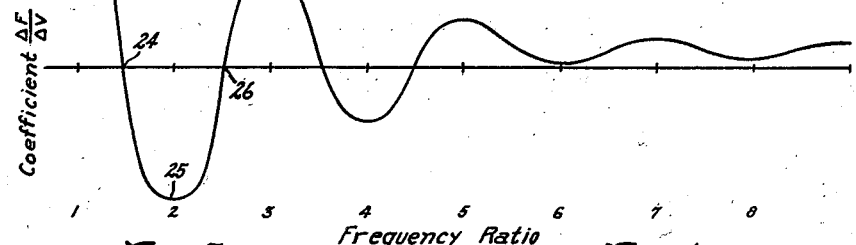

The features of my invention which I believe to be novel are set forth with particularity in the appended claims. My invention itself, however, both as to its organization and method of operation, together with further objects and advantages thereof may best be understood by reference to the following description taken in connection with the accompanying drawings, in which Fig. 1 is an embodiment of my invention; Fig. 2 is a curve indicating a characteristic thereof, and Figs. 3, 4, 5 and 6 are additional embodiments of my invention.

Referring to Fig. 1 of the drawings, I have shown therein an electron discharge device 10, which has three control electrodes 1, 2 and 3, a cathode and an anode 4, the anode and the first control electrode 1 being connected to opposite ends of a tuned circuit formed by a condenser 11 and an inductance 12; and the cathode and second, or screen, electrode 2 being connected to the opposite ends of a second tuned circuit formed by a condenser 13 and an inductance 14. An intermediate point of the inductance 12 is connected through a conductor 15 to the positive terminal of a source of operating potential, not shown, the negative terminal of which is connected to ground. The intermediate point of coil 12 is also connected through a high frequency by-passing condenser 16 to ground and to the cathode of tube 10. A condenser 17 is connected between the first control electrode of the device 10 and the end of the tuned circuit 11, 12 to prevent the continuous anode potential from influencing the control electrode 1. A grid leak resistor 18 is connected between the control electrode 1 and ground.

Potential for the screen grid 2 is supplied thereto from conductor 15 through resistance 20 and the inductance coil 14, by-pass condenser 19 being connected between the lower terminal of coil 14 and ground at the cathode of device 10. The suppressor grid 3 is connected directly to the cathode. A variable damping resistor 21 is connected between the ends of the tuned circuit 13, 14.

In operation, electric oscillations are maintained in the tuned circuit 11, 12 by action of the discharge device 10. The tuned circuit 13, 14 is made resonant at a frequency somewhat different than a harmonic of the frequency to which the tuned circuit 11, 12 is adjusted. By suitably adjusting the resonant frequency of the tuned circuit 13, 14 near one of these harmonics, the condition may be obtained in which the operating frequency of the discharge device 10, as determined by the tuned circuit 11, 12 does not vary during comparatively large changes in the operating potential of the oscillator. By tuning the circuit 13, 14 in one direction from this adjustment the frequency of operation of the oscillation generator may be made to increase upon an increase in operating potential. Conversely, by tuning the circuit 13, 14 in the opposite direction from that adjustment the operating frequency of the generator may be made to decrease upon an increase in operating voltage.

Referring to Fig. 2, the abscissa of the curve 22 shown therein represents the ratio of the resonant frequency of the circuit 13, 14 to the frequency of the circuit 11, 12, and the ordinate represents the coefficient of frequency change of the oscillator of Fig. 1 with respect to change in operating potential. This coefficient has been represented in the drawing by $$\frac{\Delta F}{\Delta V}$$

where ΔF is the change in oscillation frequency and ΔV the change in operating voltage. The curve 22 illustrates the manner in which the above-mentioned coefficient appears to vary as the ratio of frequencies of the tuned circuits 11, 12 and 13, 14 changes. If the ratio of frequencies be near unity, the coefficient of frequency change with respect to change of operating voltage is near its greatest absolute value, as illustrated by point 23 on the curve 22. As the tuned circuit 13, 14 is adjusted for higher resonant frequencies, and the circuit 11, 12 is maintained at a constant adjustment, a point is reached at which the coefficient is zero, as illustrated at point 24 on the curve. As the resonant frequency of the circuit 13, 14 is increased still further, a point is reached at which the circuit 13, 14 is resonant near the second harmonic of the frequency to which the circuit 11, 12 is tuned, where the coefficient of frequency change with respect to change of operating potential is at a maximum absolute value, opposite in sign to the value which exists at the point 23, as shown by the point 25. As the resonant frequency of the circuit 13, 14 is increased still further another point is reached at which the coefficient is again zero, as illustrated by point 26. Upon further increase in resonant frequency the cycle of change in the coefficient repeats itself over and over, the amount of change in the coefficient in each cycle becoming less and less. It is therefore obvious that an oscillation generator embodying my invention may be adjusted so that its coefficient of frequency change with respect to change of voltage may, within limits, be given any desired value.

As a practical matter, it is preferred to tune the resonant circuit 13, 14 near a higher harmonic of the operating frequency of the oscillator, for example, one near the third or the sixth harmonic. From the form of the curve 22 it is evident that, if a higher harmonic be used, there is less change in coefficient upon a change in frequency ratio than if a lower one be employed. It is of advantage to employ a harmonic at least as high as the second or third to avoid large amounts of interaction between the tuned circuit 13, 14 and the tuned circuit 11, 12. If too high a harmonic be chosen, the oscillator cannot be compensated so that its coefficient of frequency change with respect to change in operating potential is zero, although the coefficient may be varied to some extent. An advantage in employing a high harmonic is that the coefficient changes at a low rate with changes in resonant frequency of the tuned circuit 13, 14. It is obvious that the resonant circuit 13, 14 may in any case be adjusted so that the coefficient of frequency with respect to voltage may be given particular values, other than zero, in order to cooperate with other circuits to which it may be connected, which may have an equal coefficient of opposite sign. The complete apparatus may be made to maintain constant frequency during changes of operating potential.

The resistor 21 is provided to damp the tuned circuit 13, 14 in order to reduce the amount of variation in the coefficient of frequency change with respect to change of voltage when the circuit 13, 14 is adjusted. By reducing the amount of variation in this coefficient, it is made easier to adjust the tuned circuit 13, 14 to produce any desired coefficient and, once adjusted, the adjustment is less affected by mechanical shocks, changes in temperature, or the like.

Figure 3:
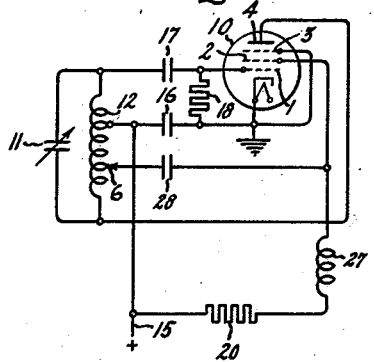

Referring to Fig. 3, there is shown an oscillation generator whose frequency controlling circuit and discharge device are identical with those illustrated in Fig. 1, and in which like parts are given like reference characters. In this figure, however, the second, or screen, electrode 2 of the device 10 is supplied from the wire 15 with operating potential through a choke coil 27 and a resistor 20. This screen electrode is also connected through a by-passing condenser 28 to a tap 6 on the inductance 12.

It has been found that, by suitably positioning the tap 6 on the inductance 12 to which the condenser 28 is connected, the coefficient of frequency change with respect to change of operating voltage for this oscillation generator may be made zero. The coefficient may be given either a positive or negative value by suitably positioning this tap. While it is not completely understood why this circuit gives such results, it is thought that the inductance 27 and the condenser 28 form part of a tuned circuit similar to the circuit 13, 14 shown by Fig. 1.

Figure 4:
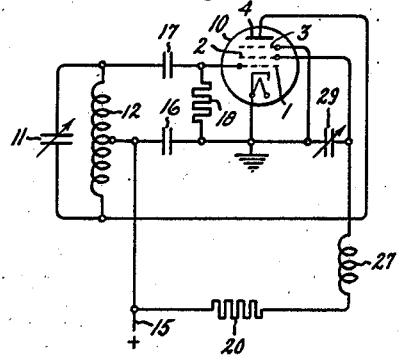

Referring to Fig. 4, there is a further modification of my invention in which the screen grid 2 is connected through an adjustable condenser 29 to the cathode of device 10 at ground, the tap 6 of Fig. 3 being dispensed with. It has been found that, by adjustment of the condenser 29 to a certain value, the coefficient of frequency change with respect to change of operating voltage for the circuit may be made zero or may be given a positive or negative value as with the circuits illustrated by Figs. 1 and 3. While the theory of operation of this circuit is likewise not understood, it is thought that the inductance 27 and the condenser 29 form a part of a tuned circuit which acts in a fashion similar to the tuned circuit 13, 14 illustrated in Fig. 1.

In any case it appears that an impedance connected in circuit with a control electrode may be given a value such that changes in operating voltage supplied to an oscillator do not affect the operating frequency. Such a stable oscillator has proved of great use in conjunction with a separate quartz crystal controlled oscillator for producing highly stable waves of adjustable frequency.

Figure 5:
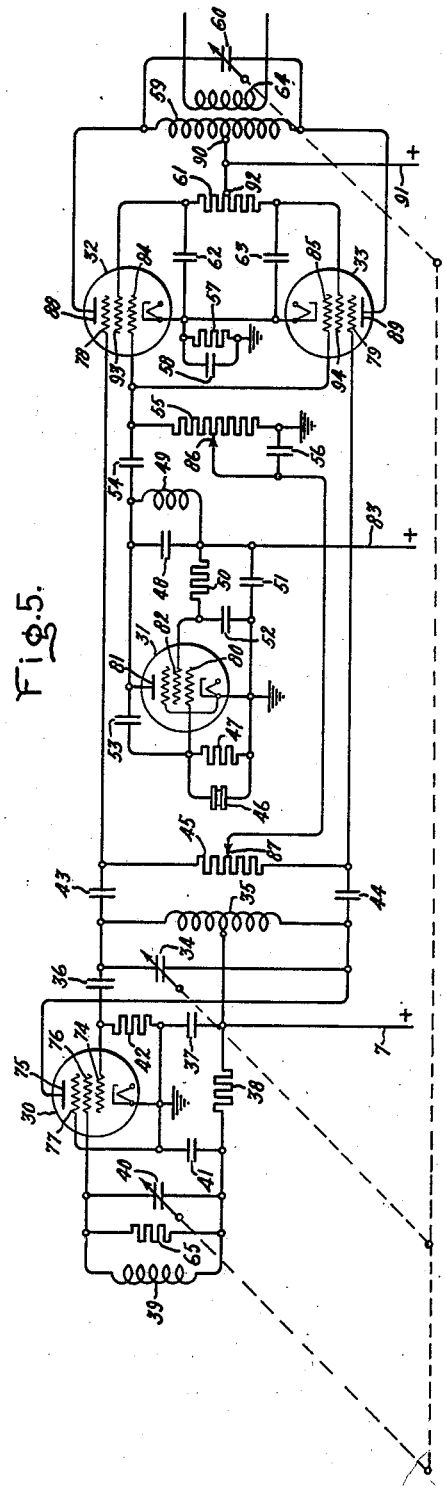

Referring to Fig. 5, there is shown a highly stable oscillation generator including as a driving element an oscillator which includes an electron discharge device 30 and is similar to that shown in Fig. 1. A second driving element for the generator comprises a crystal controlled oscillator including an electron discharge device 31, the output waves of the two oscillators being heterodyned in a mixer circuit including electron discharge devices 32 and 33.

A tuned circuit formed by a condenser 34 and an inductance 35 is connected between the anode 75 and the control electrode 74 of the device 30 through a condenser 36. The positive terminal of a source of operating potential, not shown, whose negative terminal is grounded, is connected to a wire 7 which supplies potential to the anode 75 of the device 30 through an intermediate point of the inductance 35. This intermediate point is connected through a by-passing condenser 37 to the cathode of device 30 and ground and through a resistor 38 to the lower end of a tuned circuit, formed by an inductance 39 and a condenser 40, whose upper end is connected to the second, or screen, electrode 76 of the discharge device 30. The lower end of the tuned circuit 39, 40 is by-passed to the cathode of the device 30 at ground by a by-passing condenser 41. The suppressor electrode 77 of the device 30 is connected directly to the cathode thereof. The first or control electrode 74 is connected through a grid leak resistor 42 to the cathode of the device 30 and to ground.

The variable condensers 34 and 40 are mechanically connected for unitary operation and are so arranged that, as the resonant frequency of the circuit 34, 35 is varied, the resonant frequency of the circuit 39, 40 is correspondingly varied in order to maintain the oscillator in such condition that the coefficient of frequency change with respect to change of operating voltage is substantially constant over the range of adjustability.

The inductance 35 is coupled by condensers 43 and 44 to impress alternating voltage across the resistor 45 and between suppressor electrodes 78 and 79 of discharge devices 32 and 33. Since suppressor electrodes normally operate in a condition such that no current flows, there is substantially no load taken by these electrodes from the oscillation generator which includes the device 30. Its stability is therefore favorably affected.

The crystal controlled oscillator including the device 31 comprises a quartz crystal 46, shunted by a grid leak resistor 47, connected between the first or control electrode 80 and the cathode of the device 31. The anode 81 of the device 31 is supplied with operating potential from a source, not shown, through a wire 83 and an inductance 49, the negative terminal of the source being grounded. The inductance 49 is tuned near the resonant frequency of the crystal 46 by a condenser 48 connected in shunt to the inductance. The second, or screen, electrode 82 is supplied with operating potential from the conductor 83 through a resistor 50 and is by-passed to the cathode of the device 31 at ground by a condenser 52. The wire 83 at the tuned circuit 48, 49 is by-passed to the cathode of the device 31 to provide a return circuit for high frequencies from the tuned circuit. It may be necessary to connect a very small condenser 53 between the anode 81 and the first electrode 80 of the device 31 in order to induce the device to oscillate properly.

The oscillator output is supplied from the anode of the device 31 through a coupling condenser 54 to the first or control electrodes 84 and 85 of the devices 32 and 33 in parallel. Since the crystal controlled oscillator is a device whose frequency is highly stable, during large changes of the operating voltage, or load, it is immaterial as concerns frequency stability that the first electrodes 84 and 85 draw considerable current. These electrodes are connected through a resistor 55 to ground in order to return continuous current to the cathodes, so that a grid biasing potential is developed across the resistor 55. An adjustable tap 86 on this resistor 55 is connected to the electrically central point 87 of the resistor 45 and is connected through a high frequency by-passing condenser 56 to ground. The biasing potential developed across the resistor 55 therefore maintains the third or suppressor electrodes 78 and 79 of the devices 32 and 33 at a negative potential suitable for their proper operation. The cathodes of the devices 32 and 33 are connected together and through a biasing resistor 57 and a by-passing condenser 58 in shunt thereto to ground. The biasing resistor 57 provides some additional bias for the proper operation of the control electrodes of the devices 32 and 33.

The respective anodes 88 and 89 of the devices 32 and 33 are connected together by a tuned output circuit formed by an inductance 59 and a condenser 60. Potential for the anodes is supplied through a wire 91 to the central point 90 of the inductance 59 from a source of potential, not shown, of which the negative terminal is provided. The wire 91 is also connected to the center point 92 of a resistor 61. The second, or screen, electrodes 93 and 94 of the devices 32 and 33 are supplied with operating potential through respective halves of the resistor 61. These screen electrodes are respectively by-passed to the cathodes of devices 32 and 33 by condensers 62 and 63. The tuned output circuit 59, 60 is inductively coupled to a coil 64 from which a wave may be taken whose frequency is adjustable by adjustment of the condensers 34 and 40. For convenient operation the condenser 60 is mechanically connected to be adjusted in unison with the condensers 34 and 40.

It is usually preferred that the normal operating frequency of the adjustable oscillator be as small a part of the desired output frequency as is consistent with the range of frequency adjustment to be obtained. Usually, therefore, the operating frequency of the crystal controlled oscillator is considerably higher than that of the adjustable oscillator and it is therefore an advantage that the wave of higher frequency be applied to the first electrodes of the devices 32 and 33. Since the crystal controlled oscillator is connected in parallel to the first electrodes of the devices 32 and 33, and the output circuit is connected in push-pull relation to the anodes, substantially no voltage can be produced in the output circuit by the crystal controlled oscillator. Since the frequency of the adjustable oscillator is considerably different from the resonant frequency of the circuit 59, 60, the wave therefrom is not substantially reproduced in the output circuit.

In order that the adjustment of the tuned circuit connected to the screen electrode of the adjustable frequency oscillator shall not be critical, a resistor 65 shunts the tuned circuit 39, 40 in order to provide damping therein.

Figure 6:
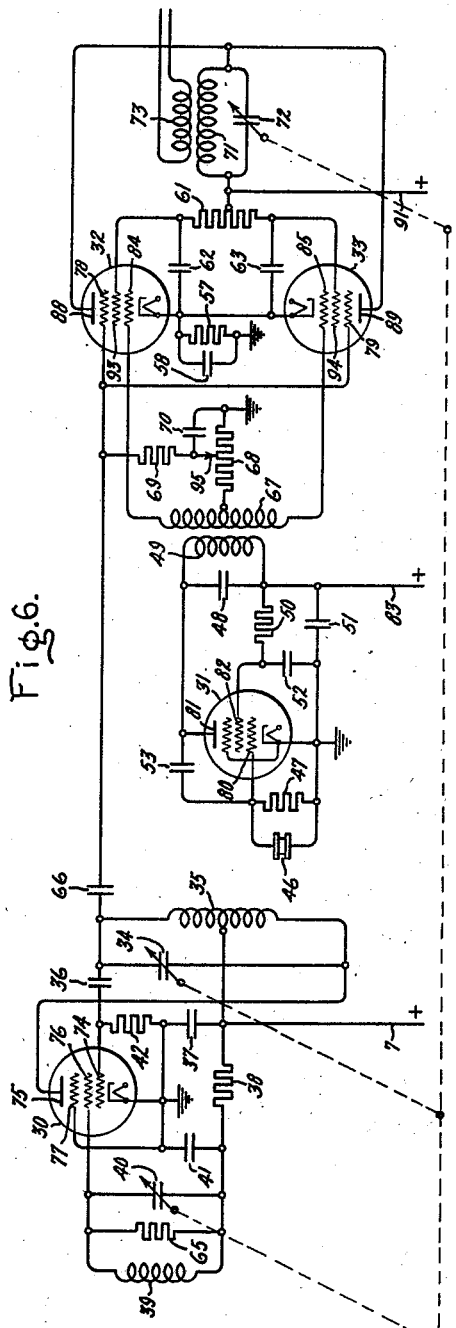

Referring to Fig. 6, there is shown a generator of the general type illustrated by Fig. 5 except that the push-pull and parallel input and output connections to the devices 32 and 33 are reversed. Since most of the elements in the circuit illustrated in Figs. 5 and 6 are identical, like parts are given like reference characters. Oscillations from the tuned circuit 34, 35 are supplied through a coupling condenser 66 to the third or suppressor electrodes 78 and 79 of the devices 32 and 33 in parallel. Oscillations from the crystal oscillator 31 are supplied to the first or control electrodes 84 and 85 of the devices 32 and 33 through transformer 49, 67. The center point of the coil 67 of this transformer is connected through a resistor 68 to ground. Since the control grids 84 and 85 of the devices 32 and 33 take current from the electron stream, a biasing voltage is developed across the resistor 68. An adjustable tap 95 on this resistor 68 is connected through resistor 69 to the third, or suppressor, electrodes 78 and 79 of the devices 32 and 33 to supply bias voltage thereto. The adjustable tap 95 of the resistor 68 is by-passed to ground by a condenser 70.

The anodes of the devices 32 and 33 are supplied with operating potential through an inductance 71 and the wire 91, which also supplies operating potential to the screen grids 93 and 94. The inductance 71 is shunted by a tuning condenser 72, which thus forms a circuit tuned to the frequency of the heterodyne wave produced in the devices 32 and 33. Oscillations from this circuit 71, 72 may be supplied in any suitable way to a desired load circuit, as by inductive coupling to a coil 73.

Since the crystal controlled oscillator drives the control grids 84 and 85 of the discharge devices 32 and 33 in push-pull relation and the anodes 88 and 89 are connected in parallel to the output circuit, no voltage can appear in the output circuit from the crystal controlled oscillator. Furthermore, since the operating frequency of the adjustable oscillator is usually considerably lower than the operating frequency of the crystal controlled oscillator, there will be so much attenuation in the tuned output circuit 71, 72 at the operating frequency of the adjustable oscillator that substantially no voltage can be induced therein from the adjustable oscillator.

It may in many instances be desirable to make the tuned output circuit resonant at a frequency which is equal to the sum rather than the difference of the operating frequencies of the crystal controlled oscillator and the adjustable oscillator. In such a case the heterodyne wave of higher frequency is selected by the tuned output circuit 59, 60 of Fig. 5, or 71, 72 of Fig. 6, and since this frequency is farther removed from the operating frequency of the adjustable oscillator than the lower frequency heterodyne wave, there is a maximum amount of attenuation for the wave from the adjustable oscillator.

In constructing circuits such as illustrated in Figs. 5 and 6 it is particularly important to connect that oscillator which is least stable with respect to frequency under loading to the electrode in the heterodyning device which consumes least power. It is of relatively little importance that the other generator, which is highly stable with respect to frequency, is connected to an electrode in the heterodyning device which consumes some power. By such connections a maximum stability of frequency is obtained.

While I have shown particular embodiments of my invention, it will, of course, be understood that I do not wish to be limited thereto, since different modifications may be made both in the circuit arrangements and instrumentalities employed, and I aim by the appended claims to cover any such modifications as fall within the true spirit and scope of my invention.

What I claim as new and desire to secure by Letters Patent of the United States is:

1. The combination, in an oscillation generator, of an electron discharge device having an anode, a cathode, and a plurality of control electrodes, a source of operating potential connected between said anode and said cathode, an oscillatory frequency determining circuit coupled to said anode and to one of said control electrodes having oscillations excited therein by action of said discharge device, the frequency of said oscillations being dependent upon the potential of said source, and means to control the extent to which said frequency is dependent upon said potential, said means including a circuit connected between another of said control electrodes and said cathode resonant at a frequency different from harmonics of, and higher than, the frequency of said oscillations and at which the coefficient of variation of frequency of said oscillations with respect to variation in said potential is of a desired predetermined value.

2. The combination, in an oscillation generator, of an electron discharge device having an anode, a cathode, and a plurality of control members, a source of operating potential connected between said anode and cathode, an oscillatory circuit connected between said anode, said cathode, and one of said control members and having continuous oscillations excited therein by action of said discharge device, the frequency of said oscillations being subject to variation upon change in said potential, and a reactance effective in such manner, between another of said control members and said cathode to produce circuit resonance at a frequency different from the frequency of said oscillations or a harmonic thereof, that said oscillations change in frequency by a predetermined amount in one direction in response to a predetermined change in potential of said source, and said reactance being adjustable to a different value at which said oscillations change by a predetermined amount in the other direction in response to the same change in potential of said source.

3. The combination, in an oscillation generator, of an electron discharge device having an anode, a cathode, and a plurality of control members, a source of operating potential for said discharge device, means for maintaining continuous oscillations in said device, said means comprising regenerative feedback connection between said anode and one of said control members, the frequency of said oscillations being subject to variation upon change in the potential of said source, and a resonant circuit connected between another of said control members and said cathode and having its resonant frequency different from the frequency of said oscillations or a harmonic thereof and adjusted to a frequency at which a desired predetermined relationship between a change in frequency of said oscillations and change in potential of said source is maintained.

4. The combination, in an oscillation generator, of an electron discharge device having an anode, a cathode, and a plurality of control members, a source of operating potential connected between said anode and said cathode, an oscillatory circuit coupled with said anode, said cathode, and one of said control members and having continuous oscillations excited therein by action of said discharge device, the frequency of said oscillations being dependent upon the potential of said source, and a resonant circuit connected between another of said control members and said cathode and having its resonant frequency adjusted to a frequency between harmonics of the frequency of said oscillations and at such a value that a desired predetermined relationship between a change in frequency of said oscillations and a change in potential of said source is maintained.

5. The combination, in an oscillation generator, of an electron discharge device having an anode, a cathode, and a plurality of control members, a source of potential connected between said anode and said cathode and between said cathode and one of said control members, an oscillatory circuit coupled with said anode, said cathode, and another of said control members having continuous oscillations excited therein by action of said discharge device, the frequency of said oscillations being dependent upon the potential of said source, a resonant circuit connected between said first control member and said cathode and having its resonant frequency adjusted to a frequency between harmonics of the frequency of said oscillations and at such a value that a desired predetermined relationship between a change in frequency of said oscillations and a change in potential of said source is produced.

6. The combination, in an oscillation generator, of an electron discharge device having an anode, a cathode, and a plurality of control members, a source of operating potential connected between said cathode and said anode and between said cathode and one of said control members, an oscillatory circuit coupled with said anode, said cathode, and another of said control members having oscillations excited therein by said discharge device, a resonant circuit connected between said first control member and said cathode and having its resonant frequency adjusted to a frequency between the harmonics of the frequency of said oscillations and at such a value that a desired predetermined relationship between a change of frequency of said oscillations and a change in potential of said source is produced, and means for adjusting the frequency of oscillation of said oscillatory circuit and the resonant frequency of said resonant circuit in unison to maintain a predetermined ratio therebetween, whereby said predetermined relationship is maintained during adjustment of the frequency of said oscillations.

7. The combination, in an oscillation generator, of an electron discharge device having an anode, a cathode, and a plurality of control members, a source of operating potential for said discharge device, means for maintaining continuous oscillations in said device, said means comprising regenerative feedback connections between said anode and one of said control members, the frequency of said oscillations being dependent upon the potential of said source, a resonant circuit connected between another of said control members and said cathode and having its resonant frequency adjusted to a frequency between harmonics of the frequency of said oscillations and of such a value that a desired predetermined relationship between a change in frequency of said oscillations and a change in potential of said source is produced, and means to damp said resonant circuit to reduce its effect upon said predetermined relationship, whereby adjustment of said resonant circuit is less critical.

8. The combination, in an oscillation generator, of an electron discharge device having an anode, a cathode, and a plurality of control members, a source of operating potential connected between said anode and said cathode, an oscillatory circuit connected between said anode, said cathode, and one of said control members having oscillations excited therein by action of said discharge device, the frequency of said oscillations being dependent upon the potential of said source, a conductive impedance connected between another of said control members and said source of potential, and a capacity effective between said other control member and a point on said oscillatory circuit the potential of which varies with respect to said cathode, said impedance and said capacity being resonant at a frequency between harmonics of the frequency of said oscillations and at such a value that a desired predetermined relationship between a change in frequency of said oscillations and a change in potential of said source is produced.

9. The combination, in an oscillation generator, of an electron discharge device having an anode, a cathode, and a plurality of control members, a source of operating potential connected between said anode and said cathode, and an oscillatory circuit coupled between said anode, said cathode, and one of said control members having continuous oscillations excited therein by action of said discharge device, the frequency of said oscillations being dependent upon the potential of said source, a conductive impedance connected between another of said control members and said source of potential, and a capacity effective between said other control member and said cathode, the combination of said impedance and said capacity being resonant at a frequency different from the frequency of said oscillations or a harmonic thereof and having a reactance at the frequency of said oscillations of such a value that a desired predetermined relationship between a change in frequency of said oscillations and a change in potential of said source is produced.

10. The combination of a wave source whose frequency is relatively stable under varying load conditions, a second wave source whose frequency is relatively less stable under varying load conditions, an electron discharge device having an anode, a cathode, and a first and a second control member, said first control member being operable with substantially no power input, means for exciting said first control member from said second wave source, means for exciting said second control member from said first wave source, means for rectifying the wave impressed upon said second control member comprising a resistance in circuit between said second control member and said cathode across which a bias voltage for said second control member is produced, and means for applying said bias voltage to said first control member.

11. The combination comprising an electron discharge device having an anode, a cathode, and a plurality of control electrodes, of means for exciting said control electrodes from separate sources of alternating voltage, means for rectifying said alternating voltage on one of said electrodes comprising a resistance in circuit between said one control electrode and said cathode across which a bias voltage for said control electrode is produced, and means for applying said bias voltage to another of said control electrodes.

12. The combination comprising an electron discharge device having an anode, a cathode, and a plurality of control electrodes, of means for exciting one of said control electrodes from a source of alternating voltage of relatively stable frequency under load, means for rectifying said alternating voltage comprising a resistance in circuit between said control electrode and said cathode across which a bias voltage for said control electrode is produced, means for exciting another of said control electrodes from a second source of alternating voltage of relatively unstable frequency under load, and means for applying said bias voltage to the other of said control electrodes to prevent rectification of the voltage thereon, whereby the load on said second source is minimized and its frequency maintained at maximum stability.

13. The combination, in an oscillation generator, of an electron discharge device having an anode, a cathode, and a plurality of control electrodes, a source of operating potential connected between said anode and said cathode, an oscillatory circuit coupled with said anode, said cathode, and one of said control electrodes having oscillations excited therein by said discharge device, the frequency of said oscillations varying with variations of said potential, and means to control the extent to which said frequency varies with variations of said potential, said means comprising a resonant circuit connected between said cathode and another of said control electrodes and resonant at a frequency higher than the frequency of said oscillations and different from a harmonic thereof.

14. The combination, in an oscillation generator, of an electron discharge device having in order a cathode, a control electrode, a screen electrode, and an anode, a source of operating potential connected between said cathode and said anode and between said cathode and said screen electrode, an oscillatory circuit coupled with said anode, said cathode, and said control electrode and having continuous oscillations excited therein by action of said discharge device, the frequency of said oscillations being dependent upon the potential of said source, a resonant circuit connected between said screen electrode and said cathode and having its resonant frequency adjusted to a frequency between harmonics of the frequency of said oscillations and of such a value that a desired predetermined relationship between a change in frequency of said oscillations and a change in potential of said source is produced.

15. The combination, in an oscillation generator, of an electron discharge device having an anode, a cathode, and a plurality of control members, a source of operating potential connected between said anode and cathode, an oscillatory circuit coupled to said anode, said cathode, and one of said control members and having continuous oscillations excited therein by said discharge device, the frequency of said oscillations being dependent upon the potential of said source, an output circuit for said oscillations coupled to said oscillatory circuit, and a reactance effective in such manner, between another of said control members and said cathode to produce circuit resonance at a frequency different from the frequency of said oscillations or a harmonic thereof, that said oscillations change in frequency by a predetermined amount in one direction in response to a predetermined change in potential of said source, and said reactance being adjustable to a different value at which said oscillations change by a predetermined amount in the other direction in response to the same change in potential of said source.

16. The combination, in an oscillation generator, of an electron discharge device having an anode, a cathode, a control electrode, and a screen electrode, a source of operating potential connected between said anode and said cathode and between said cathode and said screen electrode, an oscillatory circuit coupled with said anode, said cathode, and said control electrode and having oscillations excited therein by said discharge device, the frequency of said oscillations varying with variations in said potential, and means to reduce the extent to which said frequency varies with variations of said potential, said means comprising a resonant circuit connected between said cathode and said screen electrode and resonant at a frequency between harmonics of the frequency of said oscillations and of such a value that a change in frequency of said oscillations produced by change in said potential is a minimum.

HOWARD M. CROSBY.